United States Patent
Arai et al.

(10) Patent No.: US 10,061,406 B2
(45) Date of Patent: Aug. 28, 2018

(54) POSITION POINTER

(71) Applicant: Wacom Co., Ltd., Saitama (JP)

(72) Inventors: Takayuki Arai, Saitama (JP); Takenori Kaneda, Tochigi (JP); Shinya Aoki, Saitama (JP); Yasuhiro Baba, Ibaraki (JP)

(73) Assignee: WACOM CO., LTD., Saitama (JP)

( * ) Notice: Subject to any disclaimer, the term of this patent is extended or adjusted under 35 U.S.C. 154(b) by 0 days.

(21) Appl. No.: 15/232,504

(22) Filed: Aug. 9, 2016

(65) Prior Publication Data

US 2016/0349865 A1    Dec. 1, 2016

Related U.S. Application Data

(63) Continuation of application No. PCT/JP2015/052446, filed on Jan. 29, 2015.

(30) Foreign Application Priority Data

Feb. 12, 2014    (JP) ................. 2014-023970

(51) Int. Cl.
*G06F 3/033*    (2013.01)
*G06F 3/0354*    (2013.01)
*G06F 3/03*    (2006.01)
*G06F 3/038*    (2013.01)

(52) U.S. Cl.
CPC ............ *G06F 3/03545* (2013.01); *G06F 3/03* (2013.01); *G06F 3/0383* (2013.01)

(58) Field of Classification Search
CPC ................................. G06F 3/03545

USPC ........................................................ 345/179
See application file for complete search history.

(56) References Cited

U.S. PATENT DOCUMENTS

| | | | |
|---|---|---|---|
| 5,206,785 A | 4/1993 | Hukashima | |
| 5,290,972 A | 3/1994 | Someya et al. | |
| 2005/0057534 A1* | 3/2005 | Charlier | G06F 3/0312 345/179 |

(Continued)

FOREIGN PATENT DOCUMENTS

| | | |
|---|---|---|
| EP | 2 690 529 A1 | 1/2004 |
| JP | 04-096212 A | 3/1992 |

(Continued)

OTHER PUBLICATIONS

International Search Report dated Mar. 31, 2015, for corresponding International Application No. PCT/JP2015/052446, 2 pages.

(Continued)

*Primary Examiner* — Roy P Rabindranath
(74) *Attorney, Agent, or Firm* — Seed Intellectual Property Law Group LLP

(57) ABSTRACT

A position pointer has a tubular housing having a first opening portion at one longitudinal end. A rod-shaped core body is arranged in the housing with a first end of the core body opposed to the first opening portion. A writing pressure detection circuit is arranged in the housing, which, in operation, detects a writing pressure based on movement of the core body. A signal transmitter is arranged in the housing, which, in operation, transmits a signal. The position pointer includes an elastic block of material sized and shaped to form a seal with an inner surface of the housing and positioned near the first end of the core body.

19 Claims, 11 Drawing Sheets

(56) References Cited

U.S. PATENT DOCUMENTS

2009/0289922 A1 11/2009 Henry
2010/0212976 A1* 8/2010 Baba .................. G06F 3/03545
                                                    178/19.01
2014/0347327 A1* 11/2014 Wu ........................ G06F 3/044
                                                    345/179

FOREIGN PATENT DOCUMENTS

JP        06-035592  A    2/1994
JP     2010-198193  A    9/2010
JP         5286609  B2   9/2013

OTHER PUBLICATIONS

Supplementary Partial European Search Report, dated Aug. 22, 2017, for European Application No. 15749020.2-1972 / 3106966, 19 pages.

\* cited by examiner

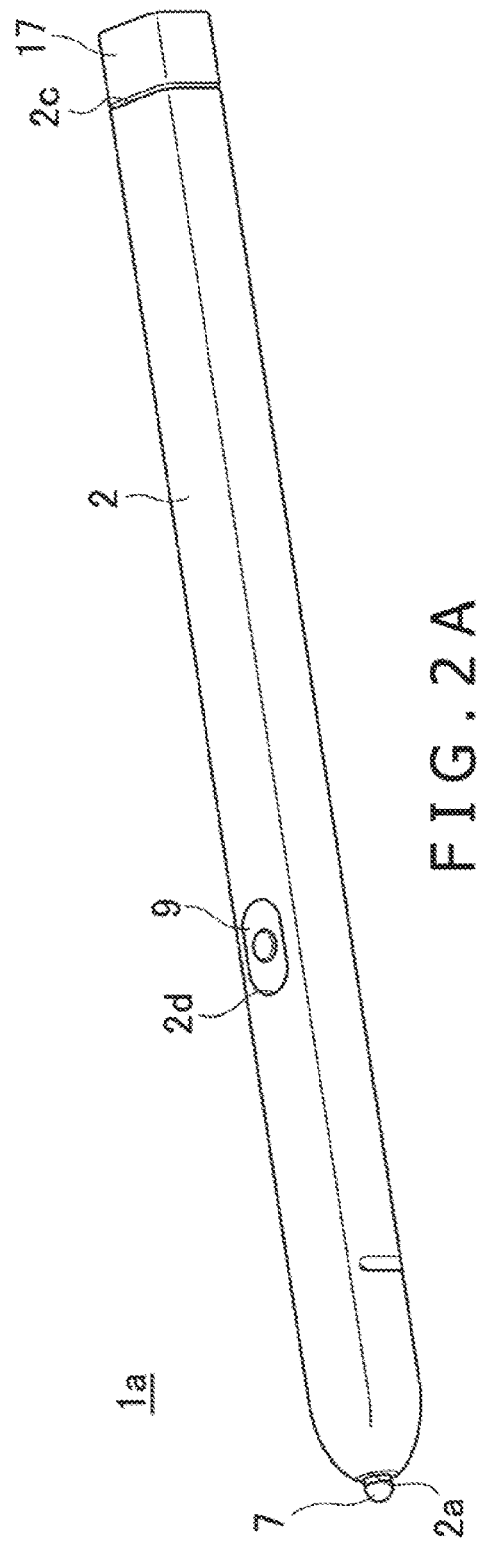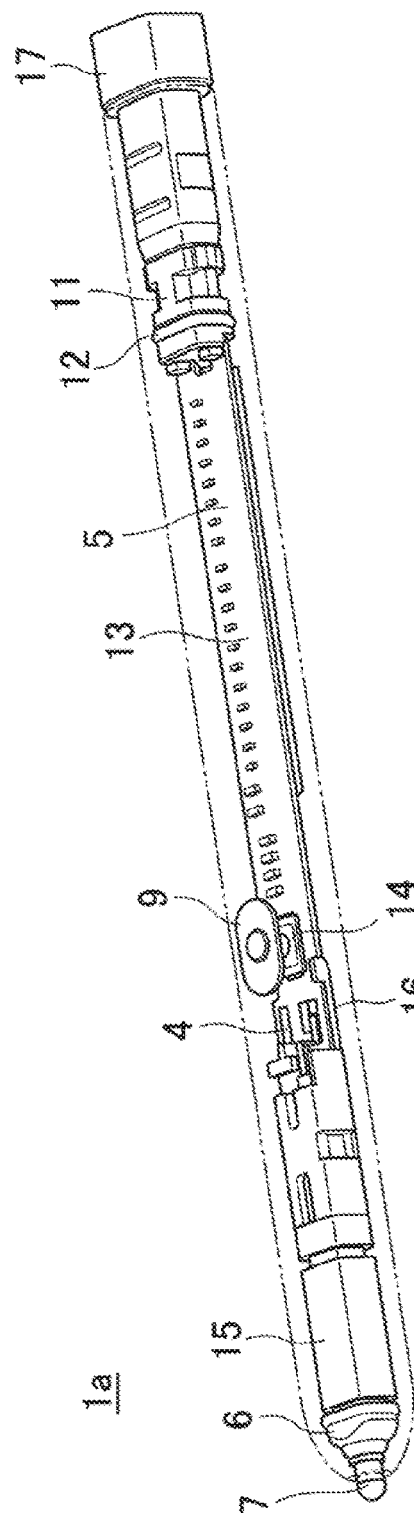

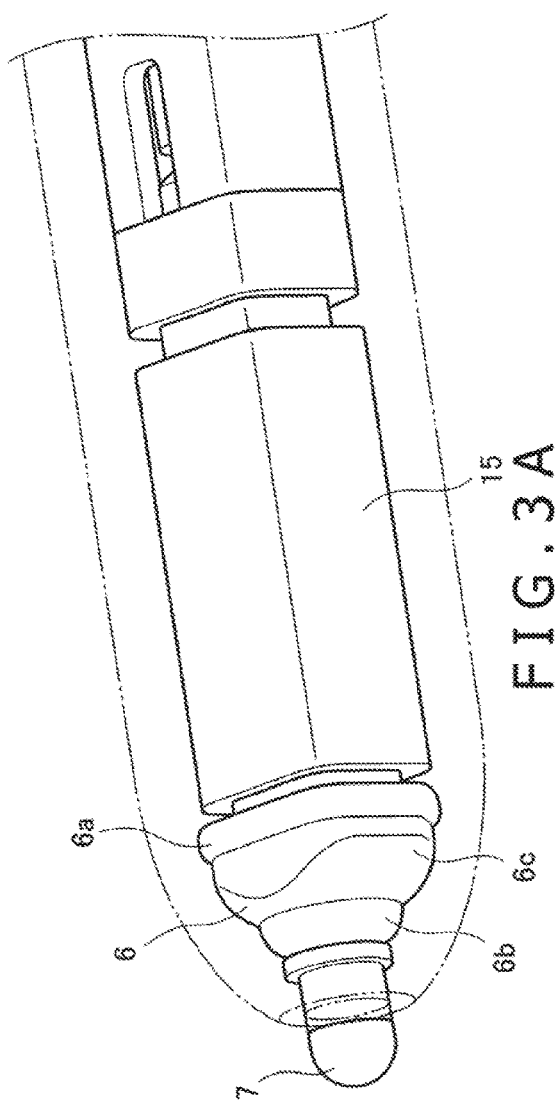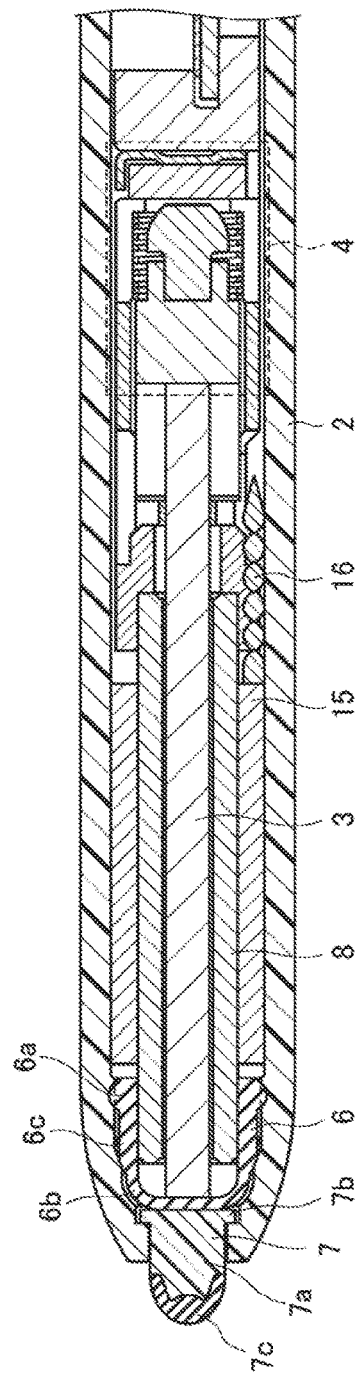

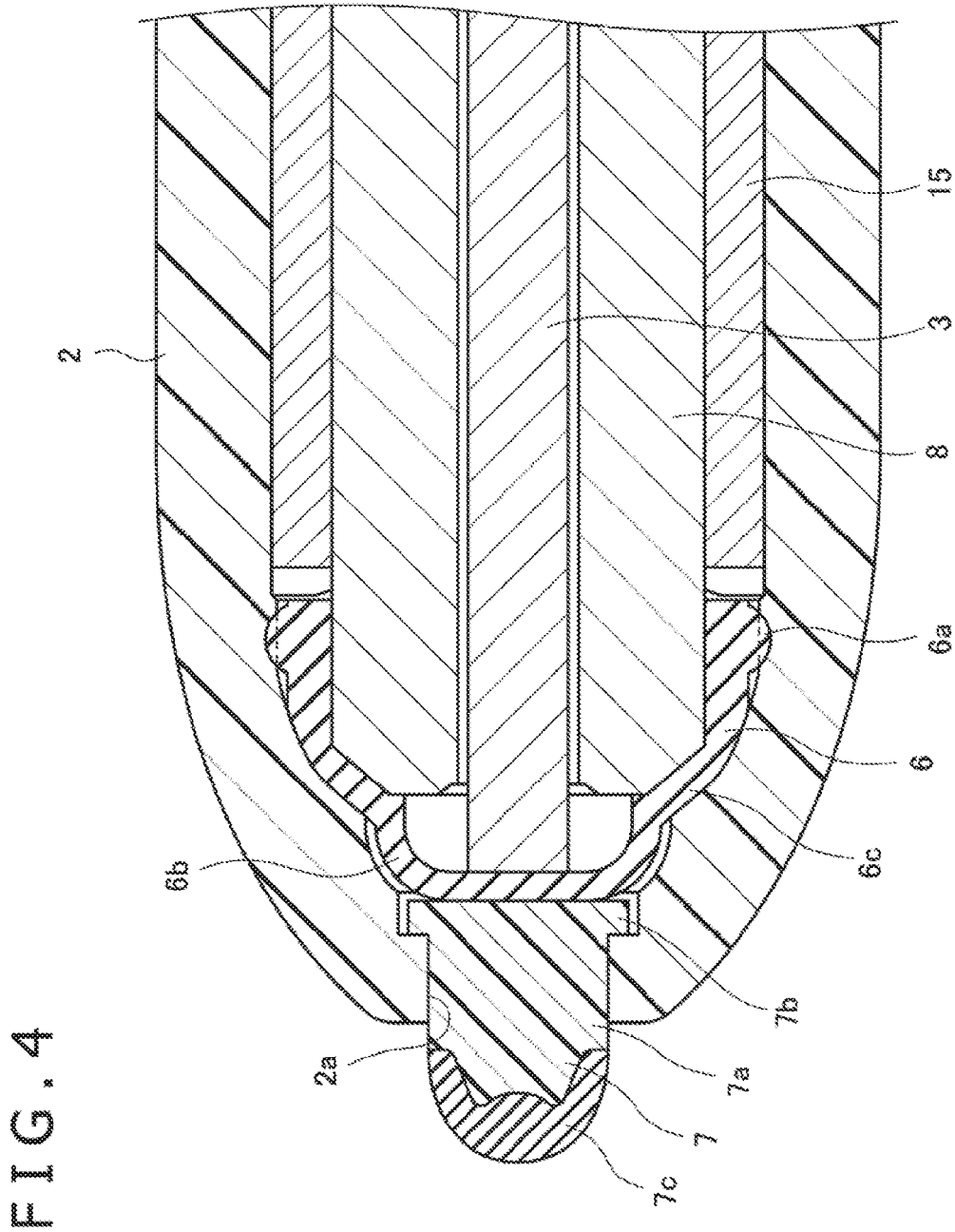

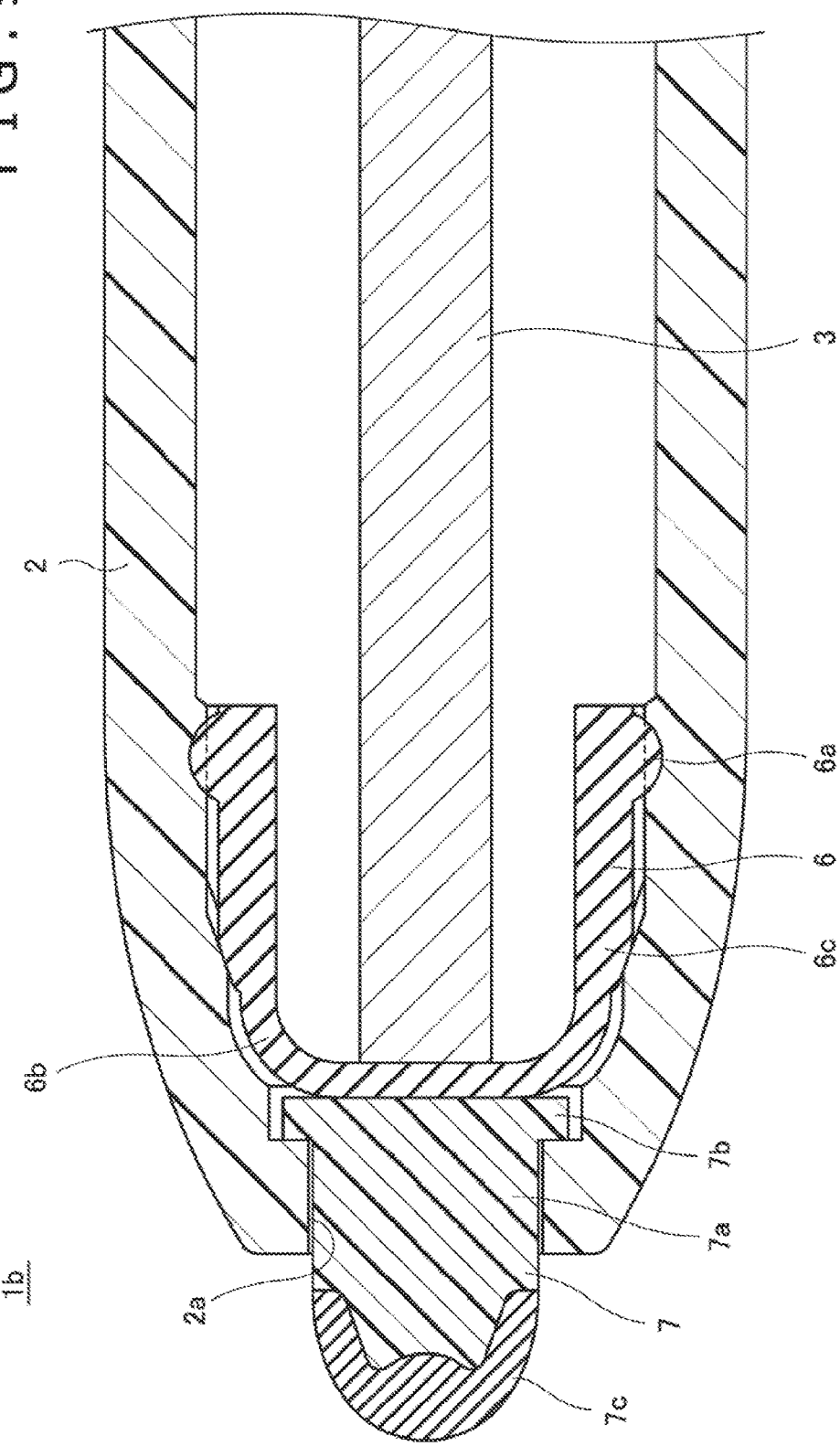

POSITION POINTER

BACKGROUND

Technical Field

The present disclosure relates to a position pointer, such as a position pointer for performing a pointing operation and entering text and graphics on a position detector.

Description of the Related Art

A touch input system is known that includes a position detector, a plate-shaped input unit, and a position pointer such as electronic pen or cursor. Depending on the position detector, a simple rod or a human finger may be used as a position pointer. Such an input system is generally called a tablet or digitizer, finding wide application for entering text and illustrations on computers such as personal computers and tablets.

The position detector has a plurality of linear conductors arranged in a matrix form (which may include a loop coil), allowing for the position detector to detect the position of the position pointer on the basis of a voltage that develops or a change thereto as a result of approach of the position pointer.

Various capacitive and electromagnetic mechanisms are known as specific mechanisms for a position detector to detect the position of a position pointer. Capacitive mechanisms take advantage of capacitance that develops between the position pointer and linear conductors in the position detector. Capacitive mechanisms may be subdivided into self-capacitance mechanisms and mutual-capacitance mechanisms. Self-capacitance mechanisms detect a voltage change in each linear conductor. Mutual-capacitance mechanisms detect a change in potential difference between intersecting linear conductors. Self-capacitance mechanisms may be further classified into mechanisms that apply a voltage to the linear conductors from the position detector side and other mechanisms that cause a voltage to develop in the linear conductors by sending a signal from the position pointer. The former may be used when the position pointer is, for example, a finger or other object that cannot send a signal. The latter may be used when the position pointer can send a signal. On the other hand, electromagnetic mechanisms send electromagnetic waves from a position detector to a position pointer by using the linear conductors as a transmission antenna. In response to the electromagnetic waves, the position pointer sends a signal that is received by the position detector by using the linear conductors as a reception antenna. Electromagnetic mechanisms may handle transmission and reception in a time-shared manner.

Patent Document 1 discloses an example of a position pointer, an electronic pen. As described in Patent Document 1, the position pointer, an electronic pen, generally includes a rod-shaped core body, a writing pressure detection section or circuitry, a signal transmission section or circuitry, and a housing. The writing pressure detection section detects a writing pressure based on movement of the core body. The signal transmission section transmits a signal. The housing accommodates the above components. An opening portion is provided at one longitudinal end of the housing to allow a pointing section to protrude.

PRIOR ART DOCUMENT

Patent Document

Patent Document 1: Japanese Patent No. 5286609

BRIEF SUMMARY

Technical Problem

Recent years have seen increasing use of the above input system outdoors, making it desirable to ensure waterproofness and dustproofness of the position pointer. The position pointer described in Patent Document 1 provides excellent waterproofness and dustproofness by covering the opening portion with a rubber cap from outside. A through hole is provided in the rubber cap to allow the core body to penetrate the rubber cap.

In an embodiment, a position pointer facilitates providing waterproofness and dustproofness of the position pointer's housing in a manner different from the position pointer described in Patent Document 1.

Technical Solution

A position pointer according to an embodiment includes a tubular housing, a rod-shaped core body, a writing pressure detection section or circuitry, a signal transmission section or circuitry, and an elastic section or block of material (e.g., a stopper, a wedge, a truncated cone, a film, etc.). The housing has a first opening portion at one longitudinal end. The core body is arranged in the housing such that one end thereof is opposed to the first opening portion. The writing pressure detection section is arranged in the housing and can detect a writing pressure from movement of the core body. The signal transmission section is arranged in the housing to transmit a signal from the housing. The elastic section covers an inner surface of the housing over an entire circumference (which may or may not be round) and is arranged between the core body and the first opening portion in such a manner as to block the first opening portion.

Advantageous Effect

In an embodiment, the first opening portion is blocked by the elastic section that covers the inner surface of the housing over its entire circumference, thus facilitating preventing water and dust from entering the housing through the first opening portion.

In an embodiment, a position pointer comprises: a tubular housing having a first opening portion at one longitudinal end; a rod-shaped core body arranged in the housing with a first end of the core body opposed to the first opening portion; a writing pressure detection circuit arranged in the housing, which, in operation, detects a writing pressure based on movement of the core body; a signal transmitter arranged in the housing, which, in operation, transmits a signal; and an elastic block of material sized and shaped to form a seal with an inner surface of the housing and positioned near the first end of the core body. In an embodiment, the elastic block of material is positioned between the first end of the core body and the first opening portion. In an embodiment, the position pointer comprises: a pen tip chip having: a main body portion positioned and sized to, in operation, pass through the first opening portion; and a flange portion positioned in the housing, wherein the flange portion is sized larger than the first opening portion. In an embodiment, when an external force is applied to the main body portion along a longitudinal direction of the housing from the first opening portion toward the first end of the core body, the elastic block of material biases the pen tip chip in a direction that counteracts the external force, and when the external force is applied to the main body portion, the pen tip chip transfers the external force to the core body via the elastic block of material. In an embodiment, the elastic block of material includes a ring-shaped portion sized and shaped to form the seal with the inner surface of the housing. In an embodiment, the elastic block of material includes a biasing portion which, in operation, responds to the external force to bias the pen tip chip in the direction that counteracts the external force. In an embodiment, the position pointer comprises: an component arranged in the housing, wherein the elastic block of material includes a holder portion to fasten the internal component to the housing. In an embodiment, the position pointer comprises: an internal component arranged in the housing, wherein the elastic block of material includes: a ring-shaped portion sized and shaped to form the seal with the inner surface of the housing; a biasing portion, which, in operation, biases the pen tip chip in a direction that counteracts the external force when the external force is applied to the main body portion from the first opening portion toward the first end of the core body; and a holder portion to fasten the internal component to the housing. In an embodiment, the internal component is a ferrite core. In an embodiment, the position pointer comprises: a pen tip chip integral with the first end of the core body, with a step between the pen tip chip and the first end of the core body, the pen tip chip being sized and shaped to pass through the first opening portion, wherein the elastic block of material includes a hole in a center portion of the elastic block of material, the core body is sized and shaped to pass through the hole, and a wall of the hole in the elastic block of material forms a seal with the step. In an embodiment, the position pointer comprises: an actuator including a flat portion arranged on an outside of a side surface of the housing, and a columnar portion arranged on an inside of a surface of the flat portion on the side of the housing, wherein the housing includes a second opening portion on a longitudinal side surface, the flat portion is sized not to pass through the second opening portion, and the columnar portion is sized to pass through the second opening portion. In an embodiment, the flat portion comprises a material of relatively high elasticity, and the columnar portion comprises a material of relatively low elasticity. In an embodiment, the position pointer comprises: an adhesive layer to attach the flat portion and the housing together. In an embodiment, the adhesive layer attaches the flat portion and the columnar portion together. In an embodiment, the housing includes a third opening portion at a second longitudinal end, and the position pointer includes: a component holder fitted into the third opening portion; and a seal to seal the component holder to the inner surface of the housing. In an embodiment, the position pointer comprises: an internal component arranged in the housing, wherein the component holder fastens the internal component to the housing. In an embodiment, the elastic block of material comprises a film.

In an embodiment, a system comprises: a position detection circuit; and a position pointer, the position pointer including: a tubular housing having a first opening portion at one longitudinal end; a rod-shaped core body arranged in the housing with a first end of the core body opposed to the first opening portion; a writing pressure detection circuit arranged in the housing, which, in operation, detects a writing pressure based on movement of the core body; a signal transmitter arranged in the housing, which, in operation, transmits a signal; and an elastic block of material sized and shaped to form a seal with an inner surface of the housing and positioned near the first end of the core body. In an embodiment, the position detection circuit is a capacitive position detection circuit. In an embodiment, the position detection circuit is an electromagnetic position detection circuit.

BRIEF DESCRIPTION OF THE SEVERAL VIEWS OF THE DRAWINGS

FIG. 2A is a perspective view illustrating an appearance of the position pointer, and FIG. 2B is a perspective view illustrating an appearance of the position pointer that depicts a housing in a transparent manner.

FIG. 3A is an enlarged view of an area of the position pointer near a front end portion, and FIG. 3B is a sectional view of the position pointer near a front end portion.

FIG. 4 is a sectional view of an area of the position pointer according to a first modification example of an embodiment near a front end portion.

FIG. 9 is a sectional view of an area of a position pointer according to an embodiment near a front end portion.

DETAILED DESCRIPTION

A detailed description will be given below of example embodiments with reference to the accompanying drawings.

A position pointer 1a according to a first embodiment will be described first with reference to FIGS. 1 to 7B.

Figure 1:
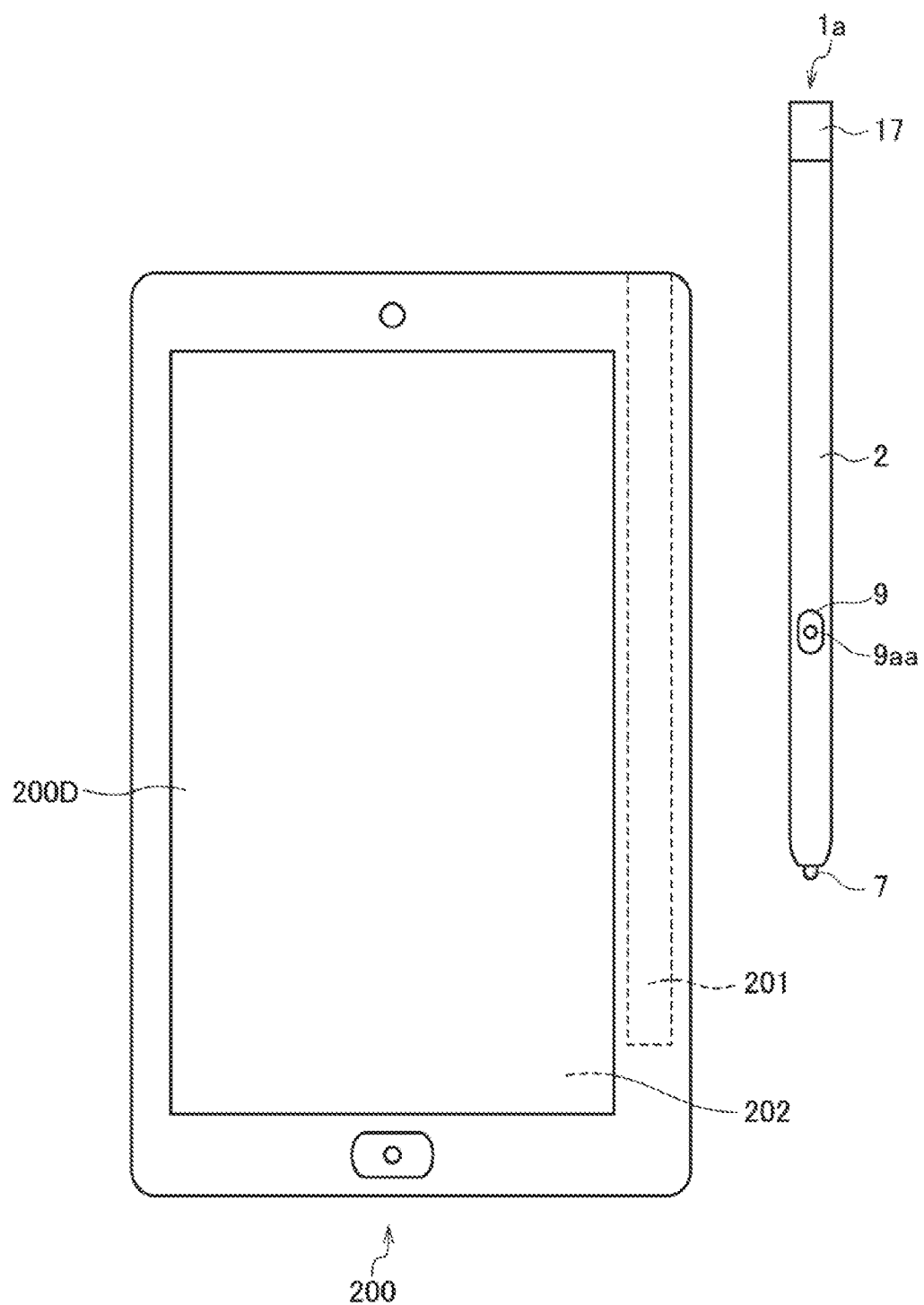
FIG. 1 is a diagram illustrating an electronic device using a position pointer according to an embodiment.

The position pointer 1a according to the present embodiment is a pen-shaped device (electronic pen) as illustrated in FIG. 1 and makes up part of an electronic device 200 that serves as an input system described above. The electronic device 200 is, for example, a smartphone or tablet terminal. Such devices have found wide application in recent years. The electronic device 200 includes a display device and a storage recess hole 201 as illustrated in FIG. 1. The display device is, for example, a liquid crystal display (LCD) with a display screen 200D. The storage recess hole 201 stores the position pointer 1a when the position pointer 1a is not used. Further, a position detector 202 is provided on the rear side of the display screen 200D.

The position detector 202 detects the position of the position pointer 1a in the display screen 200D. Further, the position detector 202 may receive a variety of information including a pressing force (writing pressure) applied to the display screen 200D from the position pointer 1a. A microprocessor (not depicted in FIG. 1) in the electronic device 200 performs a display process on the display screen 200D based on the position acquired by the position detector 202 and a variety of information. In the present embodiment, a case will be described as an example in which the electromagnetic mechanism is used as a specific mechanism for the position detector 202 to detect the position of the position pointer 1a. It should be noted, however, that an embodiment is applicable to capacitive and other mechanisms, such as an example which will be described later in a second embodiment.

As illustrated in FIGS. 2A and 2B, the position pointer 1a has a variety of components arranged inside and on the surface of a cylindrical housing 2. Among the components arranged in this manner are a core body 3, a writing pressure detection section or circuit 4, a signal exchange section or circuit 5, an elastic section or block of material 6 (e.g., a stopper, a wedge, a truncated cone, etc.), a pen tip chip 7, a ferrite core 8, an actuator 9, a component holding section or holder 11, a circuit board 13, a switch 14, a coil 15, a twisted pair cable 16, and a housing cap 17 as illustrated in FIGS. 2B and 3B.

Figure 5A:
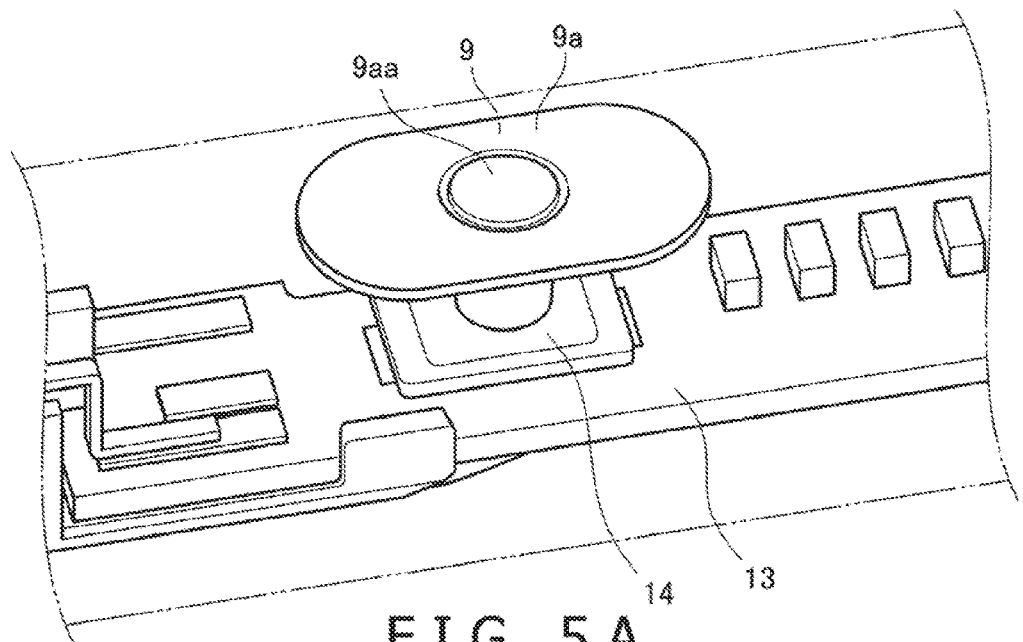
FIG. 5A is an enlarged view of an example pointer of FIG. 2B near an actuator 9.
Figure 5B:
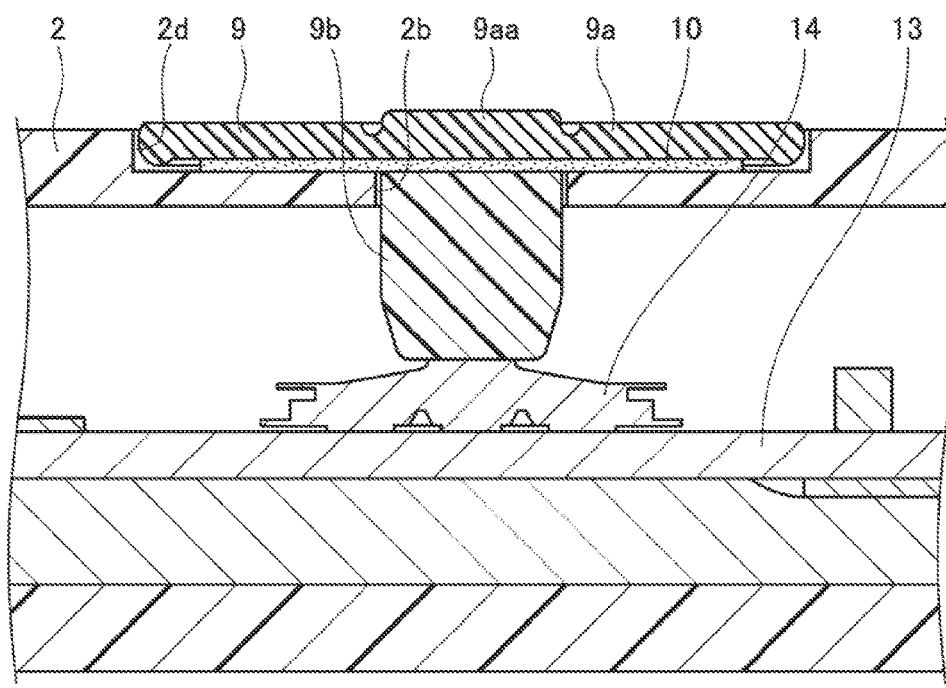
FIG. 5B is a sectional view of the example position pointer near the actuator 9.

Opening portions 2a to 2c are provided in the housing 2 as illustrated, for example, in FIGS. 2B and 5B. A description will be given below of the components arranged inside and outside the position pointer 1a with focus on the opening portions 2a to 2c.

The opening portion 2a (first opening portion) is an opening and is designed to permit passage of the pen tip chip 7 and provided at one longitudinal end of the housing 2 (end portion on the left side in FIG. 2A; hereinafter referred to as a "front end") as illustrated, for example, in FIGS. 2A and 3B. When a user uses the position pointer 1a, the user brings the pen tip chip 7 into contact with the display screen 200D. The housing 2 near the front end is tapered toward the front end as illustrated in FIG. 2A. This shape, similar to that of a ballpoint pen and pencil, is designed to give users of the position pointer 1a a feel comparable to ballpoint pens and pencils.

As illustrated in FIG. 3B, the pen tip chip 7 includes a cylindrical main body portion 7a, a disk-shaped flange portion 7b, and a semicircular protruding end portion 7c. The flange portion 7b is connected to one end of the main body portion 7a. The protruding end portion 7c is connected to other end of the main body portion 7a. The main body portion 7a is sized and shaped to pass through the opening portion 2a and arranged to pass through the opening portion 2a as illustrated in FIG. 3B. On the other hand, the flange portion 7b is sized and shaped not to be able to pass through the opening portion 2a and arranged such that a central axis direction of the disk-shaped flange portion 7b is aligned with a central axis of the housing 2. The flange portion 7b prevents the pen tip chip 7 from coming off the housing 2. The protruding end portion 7c may be made of a relatively soft material such as silicone rubber, thus providing a good writing feel to users. On the other hand, the main body portion 7a and the flange portion 7b may be made of a relatively hard material such as hard resin. This is designed to transfer an acting force (writing pressure), applied by the display screen 200D to the pen tip chip 7, to the core body 3 which will be described later in a highly efficient manner.

The flange portion 7b is arranged adjacent to the elastic section of block 6 as illustrated in FIG. 3B. More specifically, the flange portion 7b is attached to the elastic section 6 on a surface on the opposite side of the main body portion 7a. Then, one end of the core body 3 is butted against the a portion of the elastic block 6 attached to the flange portion 7b. The core body 3 is a rod-shaped member arranged in the housing 2 such that one end thereof is opposed to the opening portion 2a. The core body 3 is attached to the elastic section 6 at one end and connected to the writing pressure detection section 4 at other end. The core body 3 may be made of a hard material similar to that for the main body portion 7a and the flange portion 7b of the pen tip chip 7. As an example, the core body 3 is made of a metal-resin mixture.

When an external force is applied along the longitudinal direction of the housing 2 from the opening portion 2a toward one end of the core body 3, the pen tip chip 7 moves toward a back side of the housing 2. This movement allows the external force to be transferred to the core body 3 via the elastic section 6. When the external force is applied, the core body 3 also moves toward the back side of the housing 2. The writing pressure detection section 4 detects this movement of the core body 3, thus detecting a magnitude of the external force, e.g., a writing pressure, on the basis of a detection result. If the external force is removed, the pen tip chip 7 and the core body 3 return to their original positions thanks to an elastic force of the elastic section 6.

The elastic section 6 is an elastic member or block of material that covers an inner surface of the housing 2 over an entire circumference (which may or may not be circular) and that is arranged between the core body 3 and the opening portion 2a in such a manner as to block the opening portion 2a. That is, the elastic block of material 6 is sized and shaped to form a seal with an inner surface of the housing 2. The elastic section 6 includes a packing section or portion 6a, a biasing section or portion 6b, and a holder section or portion 6c as illustrated in FIGS. 3A and 3B. When viewed as a whole, the elastic section 6 is in the shape of a bowl, with the packing section 6a corresponding to an edge portion of the bowl, and the biasing section 6b corresponding to a bottom portion of the bowl. Materials for the elastic section 6 include rubber and resin for example.

The packing section 6a is a ring-shaped member that engages the inner surface of the housing 2 over the entire circumference of the inner surface of the housing 2. More specifically, the packing section 6a is in close contact with the inner surface of the housing 2 over the entire circumference. Thanks to the configuration of the packing section 6a and the bowl shape of the above elastic section 6 as a whole, the elastic section 6 facilitates waterproofing and dustproofing to facilitate preventing deeper entry of water and dust that has already entered the housing 2 from the opening portion 2a.

The biasing section 6b is a bowl-shaped member with a flat bottom surface and is in contact with the pen tip chip 7 at the bottom surface. Further, the holder section 6c is a ring-shaped member that is connected to the entire circumference of the packing section 6a at one end and to the entire circumference of an edge of the biasing section 6b at other end. In this configuration, when an external force is applied to the pen tip chip 7 as described above, the elastic section 6 biases the pen tip chip 7 in a direction that counteracts the external force. Further, the holder section 6c, in particular, holds an internal component of the position pointer 1a arranged in the housing 2, and more particularly, the ferrite core 8 (described in detail later) that is arranged in such a manner as to surround the core body 3 with a contracting force toward a ring center. As a result, the internal component (ferrite core 8) held by the holder section 6c is fastened to the housing 2.

It should be noted that although FIGS. 3A and 3B depict an example in which an inner diameter of the holder section 6c is constant, part or all of the inner diameter of the holder section 6c may increase gradually from the back side of the housing 2 from the opening portion 2a depending on the shape of the ferrite core 8 as illustrated in FIG. 4.

Next, the opening portion 2b (second opening portion) is an opening and is designed to permit passage of the actuator 9 and provided on a longitudinal side surface of the housing 2 as illustrated in FIG. 5B. A recess portion 2d, a recess whose depth does not penetrate the housing 2, is also provided in the longitudinal side surface of the housing 2. The opening portion 2b is provided on the inside of the bottom surface of the recess portion 2d. It should be noted that the term "inside" here refers to the fact that the edge portion of the opening portion 2b is inset over its entire circumference from the edge portion of the recess portion 2d. The recess portion 2d may be rectangular with round corners in planar shape as illustrated in FIG. 5A.

The actuator 9 includes a flat portion 9a and a columnar portion 9b as illustrated in FIGS. 5A and 5B. The flat portion 9a is arranged on the outside of the side surface of the housing 2. The columnar portion 9b is arranged on a lower surface of the flat portion 9a (surface on the side of the housing 2). Although the flat portion 9a and the columnar portion 9b may originally be separate components, the flat portion 9a and the columnar portion 9b as illustrated are attached together with double-sided tape 10 (attachment means), thus forming an integral component. The flat portion 9a has a planar shape slightly smaller than the recess portion 2d and is fitted into the recess portion 2d. The double-sided tape 10 is attached over the entire lower surface of the flat portion 9a. As a result, the entire lower surface of the flat portion 9a other than a connection area with the columnar portion 9b is attached to the bottom surface of the recess portion 2d. In contrast, the columnar portion 9b is not attached to the housing 2, thus allowing the columnar portion 9b to move vertically in the opening portion 2b.

A projecting portion 9aa is provided on an upper surface of the flat portion 9a as illustrated in FIGS. 5A and 5B. The projecting portion 9aa is arranged on the inside of the upper surface of the flat portion 9a as illustrated in FIG. 5A. The term "inside" means the same as for the opening portion 2b. The columnar portion 9b has the same planar shape and is arranged at the same planar location as the projecting portion 9aa. As a result, the columnar portion 9b is arranged on the inside of the lower surface of the flat portion 9a.

In the actuator 9 configured as described above, the columnar portion 9b is arranged on the inside of the lower surface of the flat portion 9a. Moreover, the entire lower surface of the flat portion 9a other than the connection area with the columnar portion 9b is attached to the bottom surface of the recess portion 2d, thus facilitating preventing water and dust from entering the housing 2 via the opening portion 2b. Therefore, it is safe in saying that the configurations of the actuator 9 and the double-sided tape 10 facilitate waterproofing and dustproofing to prevent entry of water and dust into the housing 2 from the opening portion 2b.

The flat portion 9a including the projecting portion 9aa may be made of a material of relatively high elasticity, and the columnar portion 9b may be made of a material of relatively low elasticity. In a specific example, the flat portion 9a is made of silicone rubber, and the columnar portion 9b is made of hard resin such as acrylonitrile butadiene styrene (ABS) resin. Further, the switch 14 is arranged under the columnar portion 9b as illustrated in FIG. 5B. The switch 14 is placed on the circuit board 13 and allows power to be turned ON and OFF when depressed. Further, the columnar portion 9b is not attached to the housing 2 as described above, thus allowing the columnar portion 9b to move vertically in the opening portion 2b. Therefore, when the user depresses the projecting portion 9aa, the pressing force thereof is transferred to the columnar portion 9b via the flat portion 9a, thus lowering the columnar portion 9b. Then, as a result, the switch section 14 is depressed, thus switching the switch 14 between ON and OFF states. When the projecting portion 9aa is not depressed by the user, the columnar portion 9b moves upward thanks to the elastic force of the flat portion 9a, thus keeping the switch 14 undepressed.

Figure 6:
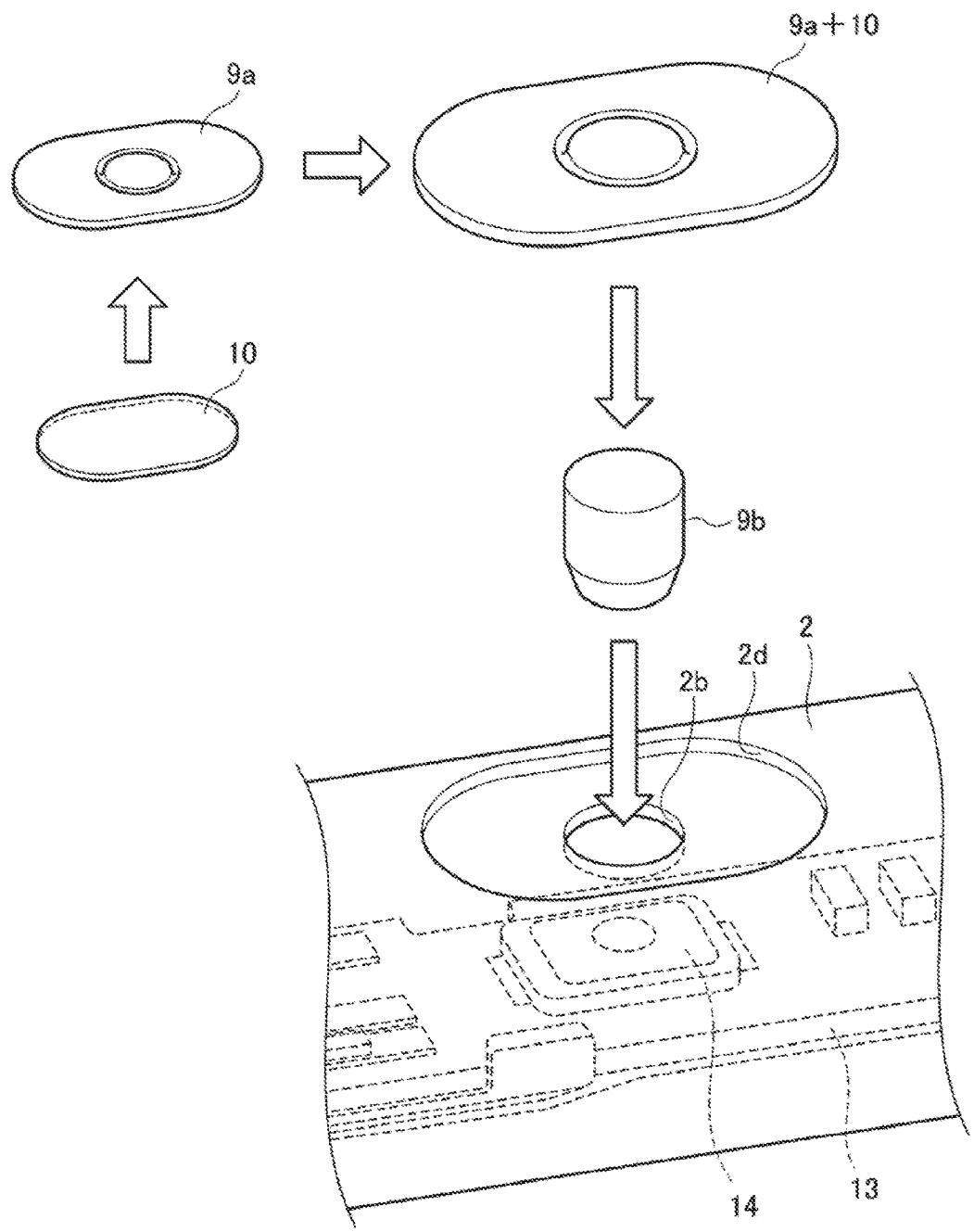
FIG. 6 is an explanatory diagram describing steps for forming the actuator 9.
Figure 7:
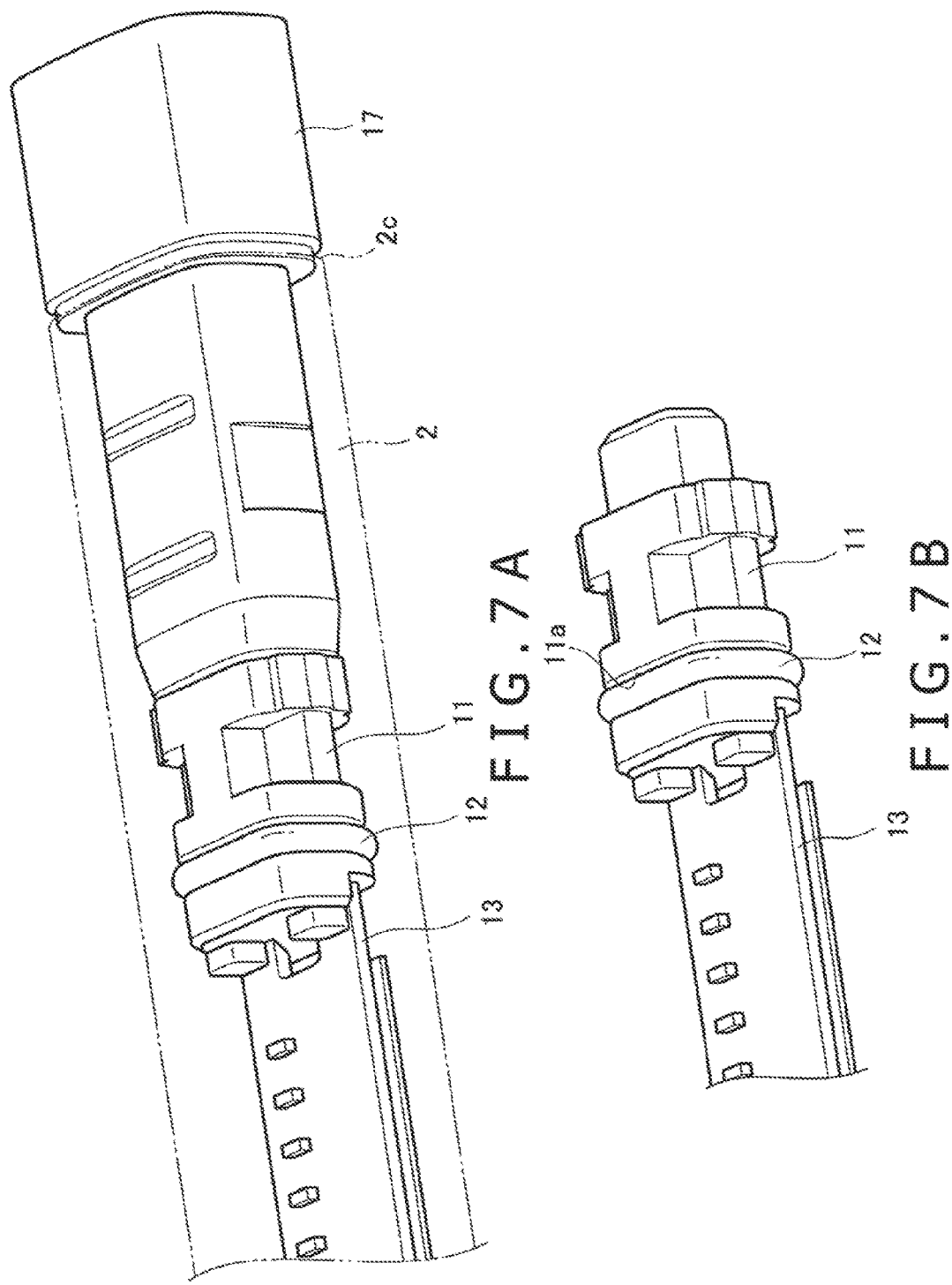
FIG. 7A is an enlarged view of an example pointer of FIG. 2B near a rear end portion of the position pointer.
FIG. 7B is a perspective view of a component holding section and other components of internal components of the example position pointer.

A description will be given here of a method by which to form and assemble the actuator 9 with reference to FIG. 6. With this method, the flat portion 9a and the double-sided tape 10 having the same planar shape as the flat portion 9a are formed first. Then, the double-sided tape 10 is attached to the lower surface of the flat portion 9a. In this condition, the columnar portion 9b is pressed against the lower surface of the flat portion 9a. At this time, a planar positional relationship between the flat portion 9a and the columnar portion 9b is verified to be the same as a planar positional relationship between the recess portion 2d and the opening portion 2b. The columnar portion 9b pressed against the lower surface of the flat portion 9a is attached to the flat portion 9a with the double-sided tape 10, thus forming the actuator 9. Then, the actuator 9 is fitted into the recess portion 2d while at the same time passing the columnar portion 9b through the opening portion 2b. The entire lower surface of the actuator 9 fitted in this manner other than the connection area with the columnar portion 9b comes into close contact with the bottom surface of the recess portion 2d. This configuration facilitates preventing entry of water and dust into the housing 2 via the opening portion 2b.

It should be noted that although, in the present embodiment, the flat portion 9a and the columnar portion 9b are molded separately and attached together with the double-sided tape 10 to form the actuator 9 as a single component, the actuator 9 may be molded integrally. In this case, a highly elastic member may be used for the actuator 9 as when the flat portion 9a and the columnar portion 9b are molded separately.

Next, the opening portion 2c (third opening portion) is an opening and is designed to permit insertion of a component (internal component) of the position pointer 1a to be arranged in the housing 2 into the housing 2. The opening portion 2c is provided at other longitudinal end of the housing 2 (end portion on the right side in FIG. 2A; hereinafter referred to as a "rear end") as illustrated in FIG. 2A. The component holding section 11 is fitted into the opening portion 2c as illustrated in FIG. 7A. The component holding section 11 holds the component (internal component) arranged in the position pointer 1a and fastens the component to the housing 2. The opening portion 2c as a whole is sealed by the housing cap section 17 that is fitted to the component holding section 11.

A groove 11a is provided in the component holding section 11 to extend along an entire circumference of the component holding section 11 as illustrated in FIG. 7B. An O-ring 12 (sealing member) is fitted in the groove 11a. The component holding section 11 is maintained in close contact with the inner surface of the housing 2 over the entire circumference thereof by the O-ring 12. As a result, the O-ring 12 facilitates waterproofing and dustproofing to prevent deeper entry of water and dust that has already entered the housing 2 from the opening portion 2c. Further, the O-ring 12 fastens the component holding section 11 to the housing 2.

Still further, the component holding section 11 is joined to the housing cap section 17 at its end portion on the side of the opening portion 2c and to the circuit board 13 at its other end portion on the opposite side as illustrated in FIGS. 7A and 7B. The component holding section 11 is fastened to the housing 2 with the O-ring 12 as described above. Therefore, not only the housing cap section 17 and the circuit board 13 but also various components formed on the circuit board 13 are also fastened to the housing 2. It should be noted that the component holding section 11 and the housing cap section 17 may be formed as an integral component.

A description has been given of various components arranged inside and outside the position pointer 1a with focus on the opening portions 2a to 2c. A description will be given next of remaining components that have yet to be described.

As illustrated in FIG. 3B, the ferrite core 8 is a tubular magnetic material, with the core body 3 running through the tube. The coil 15 is a coil which includes a wire wound around the ferrite core 8, with the core body 3 running in a center of the coil. The coil 15 is coupled to the signal exchange section or circuit 5 (refer to FIG. 2B) with the twisted pair cable 16. The signal exchange section 5 is arranged on an upper surface of the circuit board 13.

The signal exchange section 5 (signal transmission section) is a circuit block that exchanges signals with the position detector 202 (refer to FIG. 1). The position detector 202 is provided on the outside of the housing 2. More specifically, the signal exchange section 5 has a function to receive, via the coil 15, signals transmitted from the position detector 202 to the position pointer 1a and a function to generate signals to be transmitted from the position pointer 1a to the position detector 202 and transmit these signals via the coil 15. The signal exchange section 5 handles transmission and reception in a time-shared manner.

The signal exchange section 5 is coupled to the writing pressure detection section 4 and the switch 14 with wiring formed on the circuit board 13, receiving writing pressure information representing a writing pressure detected by the writing pressure detection section 4 and side switch information representing an ON/OFF state of the switch 14. Among signals sent from the signal exchange section 5 are signals representing writing pressure information and side switch information and continuous signals for position detection used by the position detector 202 to detect the position of the position pointer 1a.

Figure 8:
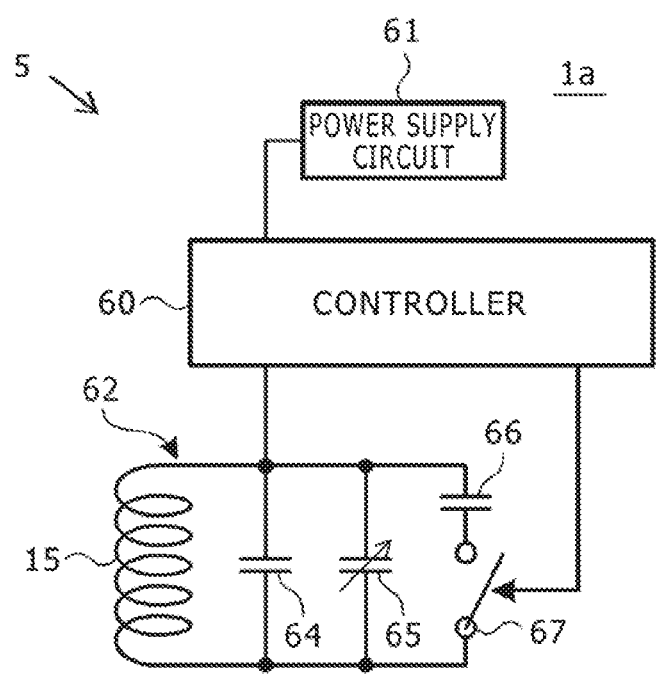
FIG. 8 is a diagram illustrating an example internal circuit of the position pointer depicted in FIG. 1.

The signal exchange section 5 includes a controller 60, a power supply circuit 61, and a resonance circuit 62 as illustrated in FIG. 8. The resonance circuit 62 includes the coil 15 described above, a capacitor 64, and a variable capacitor 65. The capacitor 64 and the variable capacitor 65 are coupled in parallel to the coil 15. Further, a capacitor 66 is coupled to the resonance circuit 62 via a switch 67.

The resonance circuit 62 resonates in response to electromagnetic waves at a specific frequency transmitted from the position detector 202. As a result, the resonance circuit 62 supplies, to the controller 60, a signal transmitted from the position detector 202. Further, the controller 60 transmits a signal via the resonance circuit 62 by using induced power generated by resonance. The controller 60 has a function to modulate such a signal to be transmitted together with the writing pressure information and side switch information. This allows information to be transmitted from the signal exchange section 5 to the position detector 202.

As described above, in the position pointer 1a according to the present embodiment, the opening portion 2a is blocked by the elastic section 6 that covers the inner surface of the housing 2 over the entire circumference, and the opening portion 2b is blocked by the double-sided tape 10 that is attached to the flat portion 9a, part of the actuator 9, and the lower surface thereof, and the opening portion 2c is blocked by the O-ring 12 that seals the component holding section 11 and the inner surface of the housing 2. This facilitates effectively preventing entry of water and dust into the housing 2 through the opening portions 2a to 2c.

A description will be given next of a position pointer 1b according to a second embodiment with reference to FIGS. 9, 10A and 10B.

The position pointer 1b according to the present embodiment differs from the position pointer 1a that supports electromagnetic position detection in that the position pointer 1b supports capacitive position detection. The position pointer 1b that supports capacitive position detection does not receive signals from a position detector. As illustrated in FIG. 9, the position pointer 1b neither has the coil 15 nor the ferrite core 8 unlike the position pointer 1a illustrated in FIG. 3B. Therefore, the holder section 6c of the elastic section 6 need not be designed to hold something particular. Further, the position pointer 1b has a signal transmission section or circuit (not depicted) that need not have a reception function rather than the signal exchange section 5. Transmission of signals by the signal transmission section may be conducted not via the coil 15 but via the core body 3 that serves as an antenna. Therefore, the core body 3 of the position pointer 1b may be made, for example, of a metallic or other material suited for use as an antenna.

The position pointer 1b may be configured in the same manner as the position pointer 1a in all other respects. Therefore, the opening portions 2a to 2c of the position pointer 1b may be blocked by respective members as are the counterparts of the position pointer 1a. This facilitates effectively preventing entry of water and dust into the housing 2 through the opening portions 2a to 2c in the position pointer 1b, as well.

A detailed description will be given below of the configuration of the position pointer 1b that transmits signals using the core body 3 as an antenna with reference to FIGS. 10A and 10B.

Figure 10A:
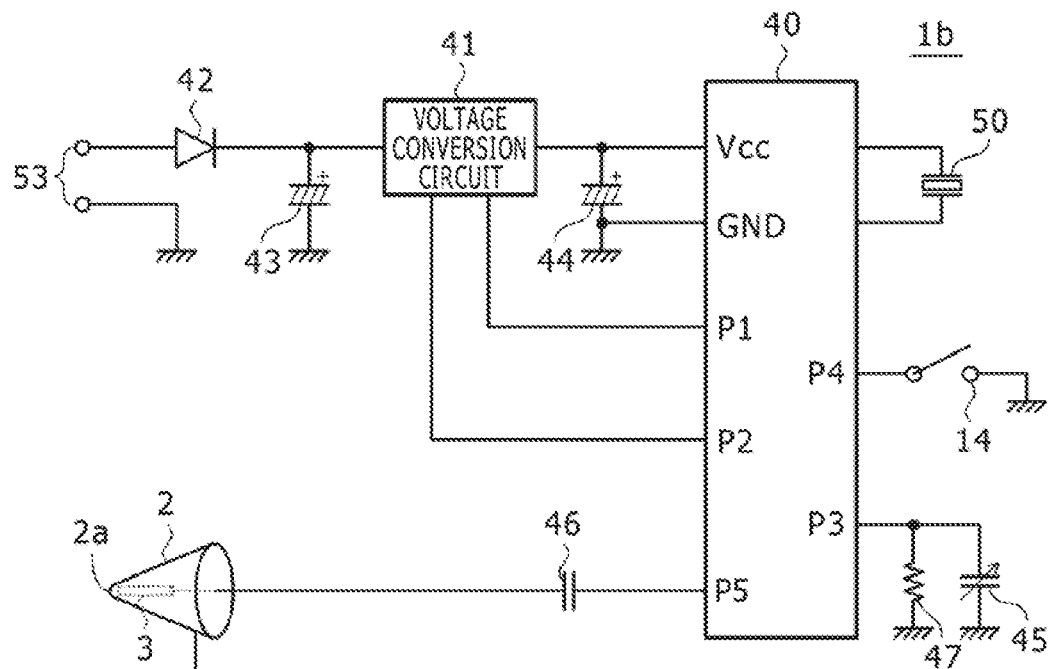
FIG. 10A is a diagram illustrating an example internal circuit of the position pointer depicted in FIG. 9.

The position pointer 1b includes a controller 40, as illustrated in FIG. 10A, a voltage conversion circuit 41, a diode 42, capacitors 43 to 46, a resistive element 47, an oscillator 50, and charging terminals 53. These components are arranged on the circuit board 13 (refer to FIG. 3B) described above.

The controller 40 is a processor that includes a read only memory (ROM) and a random access memory (RAM) (not shown). The controller 40 operates in synchronism with a clock signal generated by the oscillator 50 and in accordance with what is written in the program stored in the ROM. A clock signal period is, for example, 60 microseconds. The controller 40 has a power terminal Vcc, a grounding terminal GND, and control terminals P1 to P5 in addition to terminals coupled to the oscillator 50.

Figure 10B:
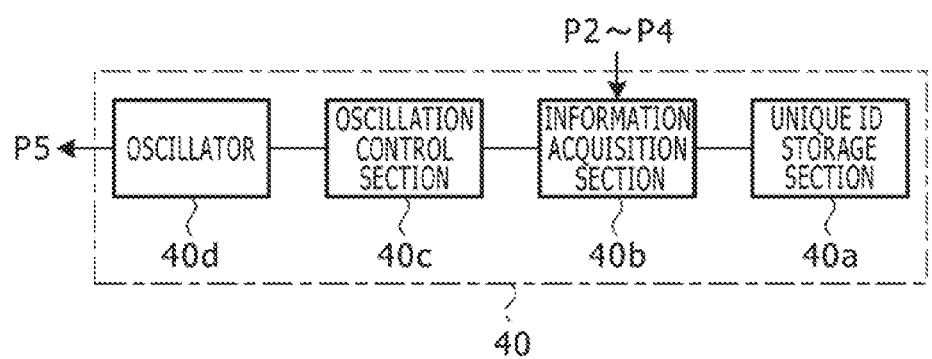
FIG. 10B is an example schematic block diagram illustrating functional blocks of a controller.

The controller 40 functionally includes a unique identification (ID) storage section or memory 40a, an information acquisition section or circuit 40b, an oscillation control section or circuit 40c, and an oscillator 40d as illustrated in FIG. 10B. Of these components, the information acquisition section 40b, the oscillation control section 40c, and the oscillator 40d make up the signal transmission section or circuit. Further, the information acquisition section 40b also serves as the writing pressure detection section 4 (refer to FIG. 3B) together with a capacitor 45 and a resistive element 47.

The capacitor 43 is coupled to the power terminal Vcc of the controller 40 via the voltage conversion circuit 41 as illustrated in FIG. 10A. The capacitor 43 is an electric double-layer capacitor that serves as a power supply for the position pointer 1b, with an anode thereof coupled to an input end of the voltage conversion circuit 41 and a cathode thereof grounded. The voltage conversion circuit 41 is a direct current (DC)/DC converter that converts a voltage across the capacitor 43 into a rated voltage of the controller 40.

The anode of the capacitor 43 is also coupled to the charging terminals 53 via the diode 42. The charging terminals 53 include two terminals, one positive and the other negative. The positive terminal is coupled to the anode of the capacitor 43. The negative terminal is grounded in the position pointer 1b. A power supply device is a terminal which is coupled to the charging terminals 53. The capacitor 43 is charged when a power supply device is coupled to the charging terminals 53. A battery (not depicted) of a size that can be accommodated in the housing 2, for example, is suitable for use as a power supply device.

A capacitor 44 is coupled between the power terminal Vcc and the grounding terminal GND. The capacitor 44 is provided to stabilize a source voltage supplied to the controller 40 from the voltage conversion circuit 41. More specifically, an aluminum electrolytic capacitor of several tens to several hundreds of microfarad is suitable for use, for example.

The voltage conversion circuit 41 steps down or up a voltage in accordance with the voltage across the capacitor 44. That is, the maximum voltage across the capacitor 44 is designed to be higher than the rated voltage of the controller 40. Therefore, when the capacitor 44 is sufficiently charged, the voltage across the capacitor 44 is higher than the rated voltage of the controller 40. For this reason, the voltage conversion circuit 41 steps down the voltage such that the voltage supplied to the power terminal Vcc is equal to the rated voltage of the controller 40 in this case. On the other hand, when the capacitor 44 is not sufficiently charged, the voltage across the capacitor 44 may be lower than the rated voltage of the controller 40. In such a case, the voltage conversion circuit 41 steps up the voltage such that the voltage supplied to the power terminal Vcc is equal to the rated voltage of the controller 40.

The voltage conversion circuit 41 is also coupled to the control terminals P1 and P2 of the controller 40. When the controller 40 supplies a given control signal to the voltage conversion circuit 41 via the control terminal P1, the voltage conversion circuit 41 detects the voltage across the capacitor 44, outputting a signal representing the voltage level to the control terminal P2.

The information acquisition section 40b of the controller 40 determines whether it is necessary to charge the capacitor 44 on the basis of the signal thus supplied to the control terminal P2, generating charging request information representing this result. Charging request information may be one-bit information that is '1' when charging is necessary and '0' when changing is not necessary.

The control terminal P3 is coupled to a grounding end individually via the capacitor 45 and the resistive element 47. The capacitor 45 is a variable capacitor coupled to the core body 3. The capacitance of the capacitor 45 changes with change in an acting force (writing pressure) applied to the pen tip chip 7 (refer to FIG. 9) from the display screen 200D (refer to FIG. 1) when the position pointer 1b is pressed against the display screen 200D.

The information acquisition section 40b of the controller 40 acquires writing pressure information representing the writing pressure from a voltage condition of the control terminal P3. This acquisition takes place while the signal transmission section of the position pointer 1b sends the continuous signal for position detection.

More specifically, the information acquisition section 40b maintains the potential of the control terminal P3 equal to a power supply potential for a given period of time immediately following the start of transmission of a continuous signal from the signal transmission section. The power supply potential is, for example, 1.5 V. This operation is designed to detect a writing pressure at this moment. That is, this operation allows charge to be stored in the capacitor 45. The amount of stored charge varies depending on the capacitance of the capacitor 45 at this time. As described above, the capacitance of the capacitor 45 changes with change in the writing pressure. Therefore, the amount of charge stored in the capacitor 45 reflects the writing pressure.

Next, the information acquisition section 40b places the control terminal P3 into a high-impedance state. As a result, the charge stored in the capacitor 45 is discharged via the resistive element 47. The information acquisition section 40b measures the time for the potential of the control terminal P3 to drop to half the power supply potential of 1.5 V, namely, 0.75 V. The larger the capacitance of the capacitor 45, the longer the time thus measured. This makes it possible for the information acquisition section 40b to acquire writing pressure information from the measured elapsed time. Writing pressure information acquired in this manner may be 10 bits to 12 bits in length.

The control terminal P4 is coupled to a grounding end via the switch 14. As described above, the ON/OFF state of the switch 14 is controlled by the user as he or she depresses the actuator 9 (refer to FIGS. 5A and 5B). The information acquisition section 40b of the controller 40 determines whether the switch 14 is ON or OFF from the voltage condition of the control terminal P4, generating side switch information representing the ON/OFF state of the switch 14 due to the result. In the present embodiment, there is only one switch 14. As a result, the side switch information is one bit long. It should be noted that the position pointer 1b may have a plurality of switches 14. In this case, the waterproofing and dustproofing described above may be employed for each of the switches 14.

The control terminal P5 is coupled to the core body 3 via the capacitor 46. Further, the housing 2 located around the core body 3 is grounded.

The unique ID storage section 40a of the controller 40 stores a unique ID which may be assigned in advance to the position pointer 1b. The unique ID may be information unique to the position pointer 1b in question and different from that assigned to any of the other position pointers 1b. For example, a unique ID includes an individual number, an owner's identification code (e.g., user ID assigned to the owner of the electronic pen), a type of the position pointer 1b, a manufacturer's number, and so on. A unique ID is, for example, 51 bits in length. Unique IDs stored in the unique ID storage section 40a are acquired by the information acquisition section 40b.

The oscillation control section 40c of the controller 40 is a circuit that controls the operation of the oscillator 40d, thus causing the oscillator 40d to output a signal modulated through binary amplitude shift keying (ASK). The oscillator 40d generates a sine wave signal at a given frequency and outputs it to the control terminal P5. The oscillation control section 40c controls such an output of the oscillator 40d to ON or OFF on the basis of a variety of information (unique ID, charging request information, writing pressure information, and side switch information) acquired by the information acquisition section 40b. As a result, a signal output from the control terminal P5 is modulated through binary amplitude shift keying (ASK).

A modulated signal thus generated is supplied to the core body 3 via the capacitor 46. It should be noted that the capacitor 46 is provided to remove a DC bias component from the modulated signal. The modulated signal that reaches the core body 3 is transmitted into the air in the form of electromagnetic waves, being received by the position detector 202 illustrated in FIG. 1.

Although example embodiments have been described above, the present disclosure is in no way limited by these embodiments. It is a matter of course that embodiment may be implemented in various ways without departing from the scope thereof.

For example, the elastic section or block of material 6 is molded in the form of a bowl in the above embodiments. However, a film elastic member may be stretched in a center portion of the ring-shaped packing section to facilitate waterproofness and dustproofness. This also facilitates preventing deeper entry, beyond the elastic section 6, of water and dust that has already entered the housing 2 from the opening portion 2a.

Figure 11:
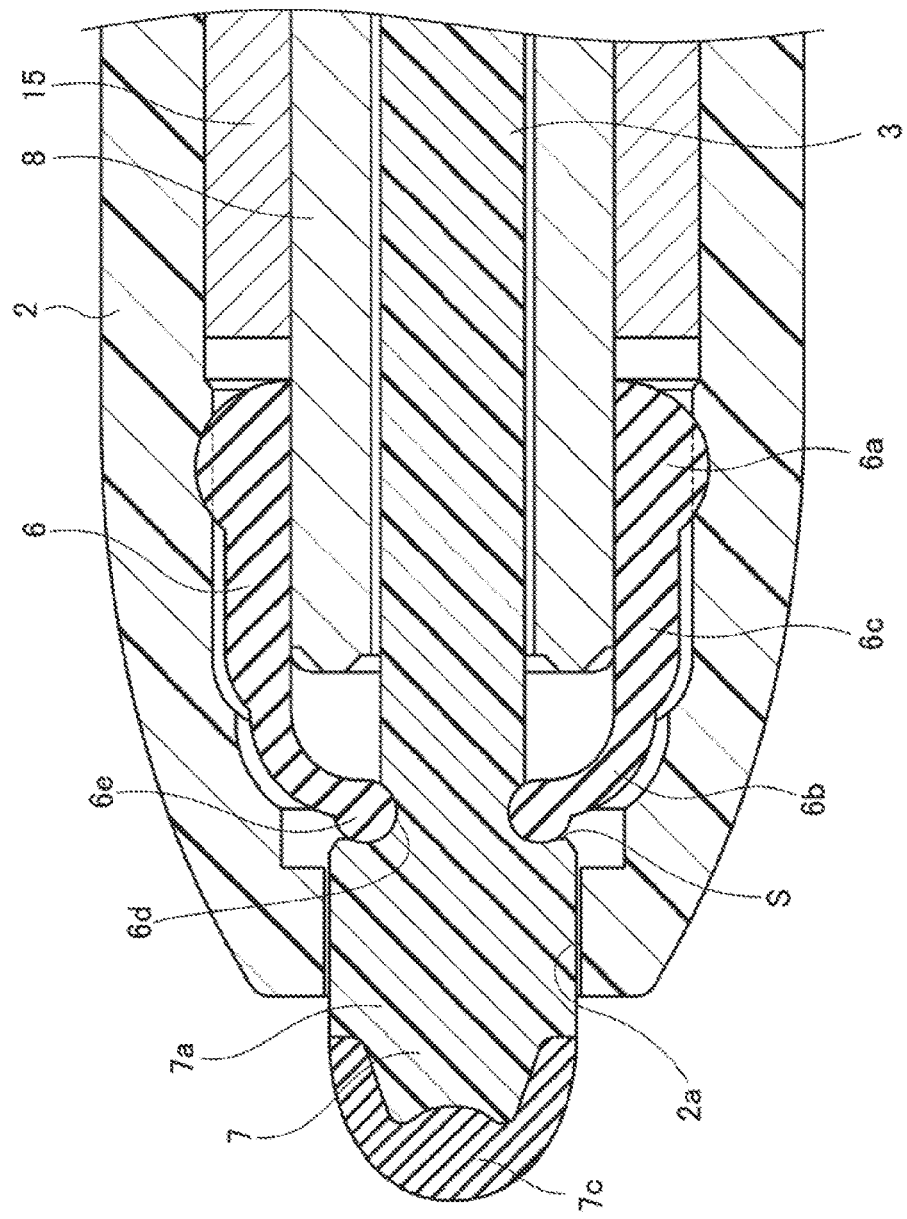
FIG. 11 is a sectional view of an area of an example position pointer according to the modification example of an embodiment near a front end portion.

As illustrated in FIG. 11, on the other hand, the pen tip chip 7, without a flange portion 7b, and the core body 3 may be formed integrally, and the core body 3 passed through a hole 6d that is formed in the center portion of the elastic section 6 (portion corresponding to the center of the plate-shaped biasing section 6b). In this case, a step S may be provided at a connection area between the pen tip chip 7 and the core body 3 by forming the pen tip chip 7 larger in diameter than the core body 3, that a packing section 6e (inner packing section) may be used in part of the elastic section 6 that corresponds to an edge of the hole 6d, and further that the packing section 6e should be brought into contact with the step S. This facilitates providing suitable waterproofness and dustproofness. Further, it is suitable that the configuration of the packing section 6e (more specifically, its diameter, material, and so on) should be selected to provide the biasing section 6b with a function to serve as a biasing section and firmly hold (tighten) the core body 3 to such an extent as to facilitate preventing the pen tip chip 7 and the core body 3 from coming off.

DESCRIPTION OF REFERENCE SYMBOLS 1a and 1b Position pointers
2 Housing
2a to 2c Opening portions of housing
2d Recess portion of surface of housing
3 Core body
4 Writing pressure detection section
5 Signal exchange section
6 Elastic section
6a and 6e Packing sections of elastic section
6b Biasing section of elastic section
6c Holder section of elastic section
6d Hole of elastic section
7 Pen tip chip
7a Main body portion of pen tip chip
7b Flange portion of pen tip chip
7c Protruding end portion of pen tip chip
8 Ferrite core
9 Actuator
9a Flat portion of actuator
9aa Projecting portion of flat portion
9b Columnar portion of actuator
10 Double-sided tape
11 Component holding section
11a Groove of component holding section
12 O-ring
13 Circuit board
14 Switch
15 Coil
16 Twisted pair cable
17 Housing cap section
40 Controller
40a Unique ID storage section
40b Information acquisition section
40c Oscillation control section
40d Oscillator
41 Voltage conversion circuit
42 Diode
43 to 46 and 64 to 66 Capacitors
47 Resistive element
50 Oscillator
53 Charging terminals
60 Controller
61 Power supply circuit
62 Resonance circuit
67 Switch
200 Electronic device
200D Display screen
201 Storage recess hole
202 Position detector
GND Grounding terminal
P1 to P5 Control terminals
S Step
Vcc Power terminal

The invention claimed is:

1. A position pointer, comprising:
a tubular housing having a first opening portion at one longitudinal end;
a rod-shaped core body arranged in the housing with a first end of the core body opposed to the first opening portion;
a writing pressure detection circuit arranged in the housing, which, in operation, detects a writing pressure based on movement of the core body;
a signal transmitter arranged in the housing, which, in operation, transmits a signal; and
an elastic block of material positioned inside of the housing near the first end of the core body, the elastic member including an exterior surface that faces the housing and a ring-shaped portion that protrudes outwardly from the exterior surface that faces the housing toward the housing and that is shaped to form a seal with an inner surface of the housing.

2. The position pointer of claim 1 wherein
the elastic block of material is positioned between the first end of the core body and the first opening portion.

3. The position pointer of claim 2, comprising:
a pen tip chip having:
a main body portion positioned and sized to, in operation, pass through the first opening portion; and
a flange portion positioned in the housing, wherein the flange portion is sized larger than the first opening portion.

4. The position pointer of claim 3 wherein,
when an external force is applied to the main body portion along a longitudinal direction of the housing from the first opening portion toward the first end of the core body, the elastic block of material biases the pen tip chip in a direction that counteracts the external force, and
when the external force is applied to the main body portion, the pen tip chip transfers the external force to the core body via the elastic block of material.

5. The position pointer of claim 4 wherein
the elastic block of material includes a biasing portion which, in operation, responds to the external force to bias the pen tip chip in the direction that counteracts the external force.

6. The position pointer of claim 4, comprising:
an internal component arranged in the housing, wherein the elastic block of material includes:
a biasing portion, which, in operation, biases the pen tip chip in a direction that counteracts the external force when the external force is applied to the main body portion from the first opening portion toward the first end of the core body; and
a holder portion to fasten the internal component to the housing.

7. The position pointer of claim 1, comprising:
a component arranged in the housing, wherein
the elastic block of material includes a holder portion to fasten the internal component to the housing.

8. The position pointer of claim 7 wherein
the internal component is a ferrite core.

9. The position pointer of claim 1, comprising:
a pen tip chip integral with the first end of the core body, with a step between the pen tip chip and the first end of the core body, the pen tip chip being sized and shaped to pass through the first opening portion, wherein
the elastic block of material includes a hole in a center portion of the elastic block of material,
the core body is sized and shaped to pass through the hole, and
a wall of the hole in the elastic block of material forms a seal with the step.

10. The position pointer of claim 1, comprising:
an actuator including a flat portion arranged on an outside of a side surface of the housing, and a columnar portion arranged on an inside of a surface of the flat portion on the side of the housing, wherein
the housing includes a second opening portion on a longitudinal side surface,
the flat portion is sized not to pass through the second opening portion, and
the columnar portion is sized to pass through the second opening portion.

11. The position pointer of claim 10, wherein
the flat portion comprises a material of relatively high elasticity, and
the columnar portion comprises a material of relatively low elasticity.

12. The position pointer of claim 10, comprising:
an adhesive layer to attach the flat portion and the housing together.

13. The position pointer of claim 12, wherein
the adhesive layer attaches the flat portion and the columnar portion together.

14. The position pointer of claim 1 wherein
the housing includes a third opening portion at a second longitudinal end, and
the position pointer includes:
a component holder fitted into the third opening portion; and
a seal to seal the component holder to the inner surface of the housing.

15. The position pointer of claim 14, comprising:
an internal component arranged in the housing, wherein the component holder fastens the internal component to the housing.

16. The position pointer of claim 1 wherein the elastic block of material comprises a film.

17. A system, comprising:
a position detection circuit; and
a position pointer, the position pointer including:
a tubular housing having a first opening portion at one longitudinal end;
a rod-shaped core body arranged in the housing with a first end of the core body opposed to the first opening portion;
a writing pressure detection circuit arranged in the housing, which, in operation, detects a writing pressure based on movement of the core body;
a signal transmitter arranged in the housing, which, in operation, transmits a signal; and
an elastic block of material positioned inside of the housing near the first end of the core body, the elastic member including an exterior surface that faces the housing and a ring-shaped portion that protrudes outwardly from the exterior surface that faces the housing toward the housing and that is shaped to form a seal with an inner surface of the housing.

18. The system of claim 17 wherein the position detection circuit is a capacitive position detection circuit.

19. The system of claim 17 wherein the position detection circuit is an electromagnetic position detection circuit.

* * * * *